J. GILBERT.

BAKE-PAN.

No. 7,752. Reissued June 19, 1877.

Attest:
Fred Benjamin
Howard Hardy

Inventor
J. Gilbert
By his attorney
O. Drake.

N. PETERS, PHOTO-LITHOGRAPHER, WASHINGTON, D. C.

UNITED STATES PATENT OFFICE.

JOHN GILBERT, OF NEWARK, NEW JERSEY.

IMPROVEMENT IN BAKE-PANS.

Specification forming part of Letters Patent No. 177,114, dated May 9, 1876; reissue No. 7,752, dated June 19, 1877; application filed May 10, 1877.

*To all whom it may concern:*

Be it known that I, JOHN GILBERT, of Newark, county of Essex, State of New Jersey, have invented an Improvement in Bake-Pans, of which the following is a specification:

The object of this invention is to furnish an improved bake-pan, which shall be so made that it may be struck up out of sheet metal at one operation, and may thus be made more readily and at less expense than when made in the old way.

Figure 1:
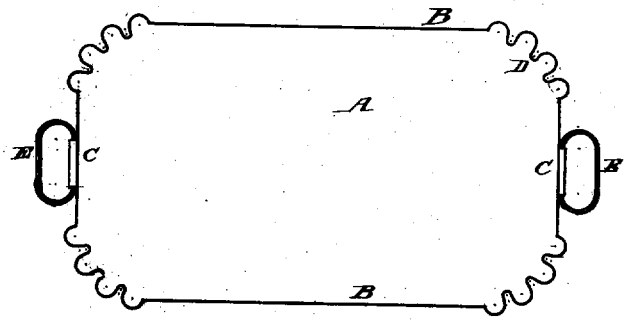
Figure 2:
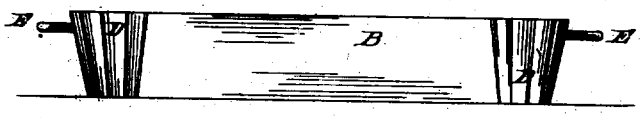

Figure 1 is a top view of my improved bake-pan. Fig. 2 is a side view of the same.

The invention consists in a pan made with straight sides and ends and corners bent or scalloped to take up the surplus metal.

A is the bottom of my improved bake-pan, the sides B and the ends C of which are made straight, and with more or less flare, as may be desired. The surplus metal is taken up at the corners, where one, two, three, four, or more scallops are formed, so that the pan can be brought into shape by a single set of dies and at a single operation. This construction also enables the pans to be made of inferior metal, which can be scalloped or bent readily to take up the surplus at the corners, while, when the metal has to be drawn into shape by a series of operations, without forming bends at the corners, only metal of superior quality can be used.

In making my improved pan, it is cut out of sheet metal to the proper size, and the corners are rounded off. The plate is then put into the dies, and is brought into shape at a single operation. In this way the metal is taken up at the corners, so that it can be brought at once into shape. When the corners are bent, as shown, the corrugations serve as spouts for the pan, in which case it is best to retain only a single corrugation in each corner.

Ears or handles E may be attached to the ends of the pan in the usual way, if desired.

Having thus described my invention, what I claim as new, and desire to secure by Letters Patent, is—

1. A pan made with straight sides and ends, and bent or scalloped at the corners, to contract the surplus metal resulting from turning up the sides and ends, substantially as herein shown and described, whereby the pan may be brought into shape by a single pair of dies and at one operation, as set forth.

2. A pan made of one piece of metal struck up to form straight sides, and with corners formed of the surplus metal bent or scalloped, substantially as described.

In testimony whereof I have signed my name to this specification in the presence of two subscribing witnesses.

JOHN GILBERT.

Witnesses:

OLIVER DRAKE,

A. D. WAGNER.